United States Patent
Kunc et al.

(10) Patent No.: US 10,242,303 B2
(45) Date of Patent: Mar. 26, 2019

(54) CARRIER SIGNAL GENERATION CIRCUIT AND METHOD FOR GENERATING A CARRIER SIGNAL

(71) Applicant: STMicroelectronics International N.V., Schiphol (NL)

(72) Inventors: Vinko Kunc, Ljubljana (SI); Iztok Bratuz, Ankaran (SI); Albin Pevec, Ljubljana (SI); Kosta Kovacic, Orehova vas (SI); Maksimiljan Stiglic, Maribor (SI)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 0 days.

(21) Appl. No.: 15/473,295

(22) Filed: Mar. 29, 2017

(65) Prior Publication Data

US 2018/0025267 A1    Jan. 25, 2018

(30) Foreign Application Priority Data

Jul. 25, 2016   (EP) ..................................... 16181009

(51) Int. Cl.
  *G06K 19/07* (2006.01)
  *G06K 19/077* (2006.01)
  *H04L 7/033* (2006.01)

(52) U.S. Cl.
  CPC ..... *G06K 19/0724* (2013.01); *G06K 19/0772* (2013.01); *G06K 19/0775* (2013.01); *H04L 7/033* (2013.01)

(58) Field of Classification Search
  CPC ..................... G06K 19/0724; G06K 19/0772
  See application file for complete search history.

(56) References Cited

U.S. PATENT DOCUMENTS

| | | | |
|---|---|---|---|
| 3,869,577 A * | 3/1975 | Couturier | ................. H04B 3/46 370/445 |
| 4,672,631 A | 6/1987 | Suzuki et al. | |
| 4,926,140 A * | 5/1990 | Schenberg | .............. H03L 7/091 327/231 |
| 5,027,373 A * | 6/1991 | Cok | ..................... G01R 25/005 327/3 |
| 5,091,702 A * | 2/1992 | Foell | ....................... H03L 7/095 331/17 |
| 5,737,694 A | 4/1998 | McMahill et al. | |

(Continued)

*Primary Examiner* — Thien M Le
*Assistant Examiner* — Asifa Habib
(74) *Attorney, Agent, or Firm* — Slater Matsil, LLP (57) ABSTRACT

In an embodiment, a carrier signal generation circuit can be used for a Radio-frequency identification (RFID) transponder device. A frequency divider circuit has a first input to receive a first frequency signal, a second input to receive a division ratio signal, and an output to provide a carrier signal as a function of the first frequency signal and the division ratio signal. A phase difference circuit has a first input to receive an analog reader device carrier signal, a second input to receive a signal based on the first frequency signal and an output to provide a digital phase difference signal as a function of the reader device carrier signal and the signal based on the first frequency signal. A signal processor has an input coupled to the output of the phase difference circuit.

19 Claims, 6 Drawing Sheets

(56) References Cited

U.S. PATENT DOCUMENTS

| | | | | |
|---|---|---|---|---|
| 5,886,583 | A | * | 3/1999 | Horiuchi .................. H03L 7/093 |
| | | | | 331/11 |
| 5,920,220 | A | | 7/1999 | Takao et al. |
| 6,144,714 | A | * | 11/2000 | Bleiweiss ............ H03K 23/667 |
| | | | | 375/376 |
| 6,714,772 | B2 | * | 3/2004 | Kasahara .............. H03L 7/0891 |
| | | | | 327/156 |
| 7,457,586 | B1 | * | 11/2008 | Hietala ................. H03F 1/3258 |
| | | | | 375/296 |
| 7,668,278 | B2 | * | 2/2010 | Robbe .................. H03D 13/004 |
| | | | | 327/147 |
| 2002/0126771 | A1 | | 9/2002 | Li et al. |
| 2005/0017773 | A1 | * | 1/2005 | Adan .................. H03D 13/004 |
| | | | | 327/156 |
| 2005/0129139 | A1 | * | 6/2005 | Jones ................. A63B 24/0021 |
| | | | | 375/295 |
| 2005/0170784 | A1 | * | 8/2005 | Ariyoshi .............. G06K 7/0008 |
| | | | | 455/67.13 |
| 2006/0139109 | A1 | * | 6/2006 | Oustaloup ................ H03H 7/06 |
| | | | | 331/17 |
| 2015/0109029 | A1 | * | 4/2015 | Lia .......................... H03L 7/097 |
| | | | | 327/105 |
| 2018/0026461 | A1 | * | 1/2018 | Rich ..................... G06F 1/1632 |
| | | | | 320/106 |

\* cited by examiner

CARRIER SIGNAL GENERATION CIRCUIT AND METHOD FOR GENERATING A CARRIER SIGNAL

CROSS-REFERENCE TO RELATED APPLICATIONS

This application claims the benefit of European Patent Application No. 16181009.8, filed on Jul. 25, 2016, which application is hereby incorporated herein by reference.

TECHNICAL FIELD

The application concerns a carrier signal generation circuit for a radio-frequency identification (RFID) transponder device and a method for generating a carrier signal in an RFID transponder device.

BACKGROUND

The present application pertains to the field of RFID systems operating at 13.56 MHz, which are usually referred to as high-frequency (HF) RFID. More specifically the generation of a response by an RFID transponder using active load modulation, ALM, is addressed. When using ALM a transponder actively generates a load modulated signal, thereby emulating the standard passive load modulation described, e.g., in ISO/IEC 14443 standard. ALM is employed instead of passive load modulation whenever the signal generated by passive load modulation is not strong enough to be detected by an RFID interrogator or reader device. This may be the case when transponder antennas are small or are located in a challenging environment, for example.

Transponders featuring ALM are required to actively generate and transmit a burst at a carrier frequency identical to the carrier frequency of an interrogating device. This means that each burst of the generated ALM carrier signal starts with the same phase difference to the carrier signal emitted by the interrogating device. Unchanged phase also implies that the frequencies of the ALM carrier signal and the carrier signal of the interrogating device are identical.

In state of the art implementations constant phase difference between the ALM carrier signal and interrogator carrier signal is achieved in two ways.

One possibility is to observe the interrogator carrier frequency before the transmission of the ALM carrier signal starts and to adjust a frequency source in the ALM transponder to substantially the same frequency. A complete transmission sequence is called a frame and is composed of series of ALM carrier bursts separated by gaps without ALM carrier emission. Once the transmission of a frame starts, the transponder frequency source is used to generate the ALM carrier frequency. This frequency source is occasionally re-adjusted during the gaps in the frame. During these gaps only the interrogator carrier signal is present on a transponder antenna, which is used as a reference frequency to re-adjust the ALM carrier frequency source. This possibility is called intra-frame synchronization.

According to a second possibility, the ALM carrier frequency source is adjusted once during the time before the ALM transmission of a frame starts and the frequency source is not re-adjusted during the frame transmission. This means the initial adjustment has to be extremely precise and stable so that the phase change during the longest frame transmission is below a limit defined in the standard, e.g., ISO 14443. The stability of the ALM carrier frequency source can thus be maintained only in case it is controlled or kept stable by an external high quality frequency reference. For this possibility the initial frequency measurement is effected, for instance, by using two phase-locked loops, PLLs, where one PLL is imbedded in another PLL. The second possibility is called inter-frame synchronization.

SUMMARY

The present application is directed to the generation of ALM carrier signals in a transponder according to the second possibility, i.e., inter-frame synchronization.

Embodiments are directed to a carrier signal generation circuit for an RFID transponder device and a method for generating a carrier signal in an RFID transponder device which enable standard compliant generation of an ALM carrier signal with reduced complexity.

The definitions as described above also apply to the following description unless stated otherwise.

In one embodiment, a carrier signal generation circuit for an RFID transponder device comprises a frequency divider circuit, a phase difference determining unit and a signal processing unit. The frequency divider circuit has a first input to receive a first frequency signal, a second input to receive a division ratio signal, and an output to provide the carrier signal as a function of the first frequency signal and the division ratio signal. The phase difference determining unit has a first input to receive an analog reader device carrier signal, a second input to receive the carrier signal or a second frequency signal dependent on the first frequency signal and an output to provide a digital phase difference signal as a function of the analog reader device carrier signal and the carrier signal or as a function of the reader device carrier signal and the second frequency signal. The signal processing unit is coupled by its input to the output of the phase difference determining unit. The signal processing unit is adapted to provide the division ratio signal dependent on the phase difference signal such that the division ratio signal is a function of a slope of the phase difference signal.

Upon detection and receipt of the analog reader device carrier signal which is sent out by an RFID interrogator device, also called reader device, the circuit starts generating the carrier signal which is later used as the carrier signal in an active load modulation. The frequency divider circuit starts operating by providing said carrier signal. The phase difference determining unit compares a phase of the received reader device carrier signal to a phase of the carrier signal provided by the frequency divider circuit to determine a phase difference between the two signals. Alternatively, the phase difference determining unit compares a phase of the received reader device carrier signal to a phase of the second frequency signal. The result of the comparison is reflected in the phase difference signal. The signal processing unit processes the phase difference signal and determines the basic slope of the phase difference signal in order to provide the division ratio signal. The division ratio signal is subsequently used by the frequency divider circuit to adjust a frequency of the generated carrier signal.

The carrier signal generation circuit as proposed measures a phase difference between the received reader device carrier and the generated signal and at the end of the measurement phase adjusts the frequency of the generated carrier according to the measurement results. This enables an implementation with reduced complexity, because a PLL is no longer necessary. As the circuit adjusts the frequency of the carrier signal to the frequency of the reader device carrier signal, a constant phase difference between these signals is achieved and the carrier signal as provided with the precision required by standards, e.g. draft amendment of ISO 14443 which is currently being defined.

Said draft amendment requires that a phase of the ALM signal which is generated by modulating the carrier signal with data to be sent to an interrogator device does not vary more than 30° compared to the interrogator or reader device carrier frequency within one frame.

The terms "reader device" and "interrogator device" here are both used as synonyms and refer to the counterpart of a transponder in an RFID communication.

In a development, the carrier signal is provided by the frequency divider circuit according to a division of the first frequency signal by an adjustable divisor which is adjusted dependent on the division ratio signal.

The division ratio signal comprises a division ratio that is calculated according to the slope of the phase difference signal. Consequently, a frequency of the carrier signal is adjusted according to the slope of the phase difference signal. By this, the frequency of the generated carrier signal is adapted to the frequency of the received reader device carrier signal and a phase difference between the generated carrier signal and the received reader device carrier signal is kept at substantially the same value.

In a further development, the carrier signal generation circuit further comprises a control unit which is coupled to the frequency divider circuit, the phase difference determining unit and to the signal processing unit. The control unit is prepared to initially align a phase of the carrier signal or a phase of the second frequency signal to a phase of the reader device carrier signal once by means of a reset or preset of the frequency divider circuit. Said reset or preset is synchronized to the reader device carrier signal.

At the beginning of the carrier signal generation and measurement of the phase difference, i.e. upon detection of a reader device carrier signal, the control unit synchronizes the phase of the internally generated carrier signal to the received reader device carrier signal by restarting the frequency divider circuit with a rising edge of the reader device carrier signal. Phase alignment may be achieved by means of a reset of the frequency divider circuit. Alternatively, the phase of the internally generated carrier signal or the phase of the second frequency signal may be set such that it has a predefined phase difference with respect to the reader device carrier signal.

This achieves an initial alignment of the phases of the signals used in the phase difference determining unit to provide meaningful results with the phase difference signal.

In a development, the phase difference determining unit comprises a clock extractor unit, a comparison unit and a post processing component. The clock extractor unit is prepared to receive the analog reader device carrier signal and to provide a digital reader device carrier signal as a function of the analog reader device carrier signal. The comparison unit is coupled to an output of the clock extractor unit and prepared to provide a preliminary phase difference signal dependent on a difference of phases between the digital reader device carrier signal and the carrier signal or the second frequency signal. The post processing component is prepared to provide the phase difference signal dependent on the preliminary phase difference signal.

The analog reader device carrier signal received via an antenna of the transponder in which the proposed carrier signal generation circuit is used is digitized in the clock extractor unit. For this purpose, the clock extractor unit may comprise a voltage comparator. The resulting digital reader device carrier signal is phase compared in the comparison unit to the generated carrier signal. The phase difference can be measured using a high frequency reference signal, for example the first frequency signal. The phase between the generated carrier signal and the received reader device carrier signal corresponds to the time interval between respective rising edges of the two signals. It can, for instance, be determined by the number of clocks or periods of the first frequency signal in case this signal is used as the high frequency reference.

This will yield a phase difference which is represented by a digital value, i.e. the number of periods of the high frequency reference and reflected in the preliminary phase difference signal. The value of phase difference is updated for every period of the reader device carrier signal or the carrier signal generated by the circuit. As initially the two signals have a frequency difference, the phase difference between the two signals increases from period to period. With increased measurement time the phase difference value may increase to a value that is higher than one period of the reader device carrier signal or the generated carrier signal. The post processing component consequently corrects the preliminary phase difference signal to account for this effect and provides the phase difference signal. Consequently, the phase difference signal, when represented with reference to time, resembles a steady increasing ramp. The frequency and/or phase difference between the received reader device carrier signal and the generated carrier signal corresponds to the slope of this ramp.

In a development the signal processing unit comprises a low pass filter component and a slope calculation component. The low pass filter component is prepared to provide a filtered signal as a function of the phase difference signal by means of low pass filtering. The slope calculation component is prepared to provide the division ratio signal by means of determining a ramp of the filtered signal.

The stream of phase difference values updated every period provided with the phase difference signal is low pass filtered in the low pass filter component. Said component is implemented, for instance by a digital first order filter. By this, a potential higher frequency alternating component of the phase difference signal is removed. The resulting filtered signal is processed in the slope calculation component which determines the fundamental ramp or slope of the filtered signal. Therein, the effect of the filtering exercised by the low pass filter component on the slope of the filtered signal is also considered and used in correctly determining the slope. The division ratio signal is provided accordingly and is subsequently used to adjust the divisor employed in the frequency divider circuit.

Due to the fact that all circuit components downstream to the clock extractor unit only process digital signals, the implementation of the carrier signal generation circuit is greatly simplified and the use of a PLL as in state of the art implementations becomes redundant.

In a further development the signal processing unit further comprises an identifier component which is prepared to provide an alternating signal dependent on the phase difference signal. The alternating signal corresponds to an alternating component of the phase difference signal and is additionally provided to the slope calculation component.

The alternating component removed from the phase difference signal is identified in the identifier component. For this, a first or a second derivation of the phase difference signal is used. The period of the alternating signal is determined. The results of this are provided by means of the alternating signal to the slope calculation component and are used to adapt a duration of the time interval used for the slope calculation, for example to a multiple of the identified period of the alternating component.

By this an error which is potentially introduced by an alternating component in the phase difference signal is cancelled such that the generated carrier signal corresponds to the best possible representation of the reader device carrier signal.

In a further development, the control unit is prepared to monitor an amplitude of the reader device carrier signal and to restart the signal processing unit in case of detection of an abrupt and significant increase of the amplitude of the reader device carrier signal.

By this, the control unit accounts for a so-called field-off event of a reader device or interrogator. It is common practice that reader devices or interrogators switch off their carrier signal for a duration between wo microseconds to a few milliseconds in order to restart transponders in the field range of their antenna. In order to prevent errors in the slope calculation, the control unit observes the reader device carrier signal. If the amplitude of said signal changes abruptly, for instance in less than 10 microseconds, and if the amplitude increases for a significant amount, at least few fold, the currently ongoing phase difference determination and slope calculation is discarded and a new measurement is started with a new signal amplitude.

In a development, the frequency divider circuit comprises a first divider component which is adapted to provide the second frequency signal dependent on the first frequency signal by means of a fixed ratio division. The frequency divider circuit further comprises a second divider component which is adapted to provide the carrier signal.

The first divider component provides the second frequency signal from the first frequency signal. The carrier signal is provided by the second divider component by means of frequency division of the first frequency signal by the adjustable divisor which is provided with the division ratio signal.

In a development, the first frequency signal is supplied by a stable high frequency source. Therein a frequency of the first frequency signal amounts to a multiple of a frequency of the analog reader device carrier signal.

The stable high frequency source may be implemented, for instance, by a quartz oscillator or a system controlled by a quartz oscillator. The proposed carrier signal generation circuit reuses a high frequency source which is already present in the device in which the circuit is implemented, for example a mobile phone. The timing resolution of the frequency source is defined by the required precision of the frequency generation. Its period is calculated by multiplying the measurement period with the target position required according to the standard. In case the target is not to exceed 20° of phase variation and the maximum frame length is 256 bits, the maximum difference between the frequency of the received reader device carrier signal and the generated carrier signal amounts to 0.17 parts per million, ppm. If a measurement time of 2 milliseconds and a precision of 0.17 ppm is envisaged, the required precision of the measurement is 240 picoseconds. The frequency of a stable high frequency source consequently has to be at least 2.94 GHz. Alternatively, a frequency source with a lower frequency may be used provided that timing resolution is increased by means of a fractional system.

The frequency of said stable high frequency source which is provided with the first frequency signal initially is divided to a frequency which is substantially in the middle of the expected reader device carrier signal frequency which, in the case of HF RFID is 13.56 megahertz +/−7 kilohertz. The resulting signal is initially used in the phase difference determining unit for comparison with the reader device carrier signal. Subsequently, the division ratio which is used in the frequency divider circuit is adjusted according to the division ratio signal.

In one embodiment a method for generating a carrier signal in an RFID transponder device is disclosed. An analog reader device receives a carrier signal. The carrier signal is generated by frequency division of a first frequency signal by an adjustable divisor which is determined depending on a division ratio signal. A phase difference signal is generated by determining a phase difference between the reader device carrier signal and the carrier signal or by determining a phase difference between the reader device carrier signal and a second frequency signal which is derived from the first frequency signal. The division ratio signal is generated dependent on the phase difference signal such that the division ratio signal is a function of a slope of the phase difference signal.

The method is realized, for example, by the carrier signal generation circuit as described above. Said circuit may be used in an RFID transponder device, which in turn may be implemented in a mobile phone.

The proposed method enables a simple generation of the carrier signal in an active load modulation using the first frequency signal as a reference clock signal and a digital signal processing which includes measuring a clock signal extracted from a reader device carrier signal, determining a phase difference between the received reader device carrier signal and the generated carrier signal and then adjusting the frequency of the generated carrier signal according to the slope of the phase difference signal once at the end of the measurement cycle.

In a development the method further comprises the step of aligning a phase of the carrier signal or a phase of the second frequency signal to a phase of the reader device carrier signal once by restarting generating the carrier signal or by restarting generating the second frequency signal, the restarting being synchronized to the reader device carrier signal.

Alternatively, the phase of the carrier signal or the phase of the second frequency signal is aligned to a desired phase difference to the phase of the reader device carrier signal, and the restarting is synchronized with the desired phase difference.

In a further development the generating of the phase difference signal comprises digitizing the analog reader device carrier signal to provide a digital reader device carrier signal, phase comparing the digital reader device carrier signal to the carrier signal or to the second frequency signal to provide a preliminary phase difference signal, and processing the preliminary phase difference signal by correcting invalid values and correspondingly providing the phase difference signal.

The phase difference is thus determined in a digital way which enables further digital signal processing of the phase difference signal.

In another development generating the division ratio signal comprises generating a filtered signal by periodically low pass filtering the phase difference signal, and determining a slope of the filtered signal.

In another development generating the division ratio signal further comprises identifying an alternating component of the phase difference signal and correspondingly providing an alternating signal, and calculating the slope of the phase difference signal by subtracting the alternating signal from the filtered signal or by aligning a slope calculation time to a period of the alternating signal.

Consequently, the influence of interferers such as other reader devices or interrogators which would cause a degradation of the phase difference measurement and slope calculation is significantly reduced. Precise generation of the carrier signal even in the presence of other interrogators or interferers is enabled.

A signal sent by an interferer couples to an antenna of the transponder in which the proposed circuit and method is used in just the same way as the reader device carrier signal of a wanted reader device or interrogator. The resulting reader device carrier signal that enters the proposed circuit therefore represents a sum of these signals. It is modulated in amplitude and phase. The amplitude modulation features a frequency corresponding to the difference of the interrogator signal frequency and the frequency of the interferer. The amplitude modulation level corresponds to the ratio of the amplitude of the two frequencies. The resulting signal also exhibits a variation of the zero crossing point which represents the phase modulation. Said phase modulation is problematic because it results in a variation of a frequency of a reader device carrier signal which is used for the phase difference determination and slope calculation.

The zero crossing point time variation caused by interfering signals can be assessed as +/−60° multiplied by the ratio of an amplitude of the reader device carrier signal and an amplitude of the interfering signal. Consequently, an interfering signal which is even 6o times weaker than the interrogator signal, causes a +/−1° zero crossing variation. In the field of HF RFID which uses a 13.56 MHz carrier, this corresponds to approximately 200 picoseconds which can already degrade the frequency measurement beyond the envisaged 0.17 parts per million.

By means of the proposed phase difference determination and slope calculation, the carrier signal can be generated even in the presence of interferers.

In a development the method further comprises monitoring an amplitude of the reader device carrier signal, and discarding the adjustable divisor provided with the division ratio signal and restarting generating the carrier signal, the phase difference signal and the division ratio signal upon detection of an abrupt and significant increase of the amplitude of the reader device carrier signal.

These steps account for the already described field-off events of an interrogator.

BRIEF DESCRIPTION OF THE DRAWINGS

The text below explains the proposed carrier signal generation circuit and corresponding method in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

The following reference symbols can be used in conjunction with the drawings.

| | |
|---|---|
| 10, 11, 12, 13, 14 | input/output |
| FDV | frequency divider circuit |
| PDDU | phase difference determining unit |
| CTL | control unit |
| SPU | signal processing unit |
| CEX | clock extractor unit |
| CMP | comparison unit |
| PRC | post-processing component |
| LPF | low-pass filter component |
| CAL | slope calculation component |
| ACI | identifier component |
| FD1, FD2 | first/second divider component |
| Fin, Sin | reader device carrier signal |
| Fg1, Fg2 | first/second frequency signal |
| Falm | carrier signal |
| Spp, Sac | signal |
| Spd | phase difference signal |
| Spf | filtered signal |
| Sdr | division ratio signal |

DETAILED DESCRIPTION OF ILLUSTRATIVE EMBODIMENTS

Figure 1:
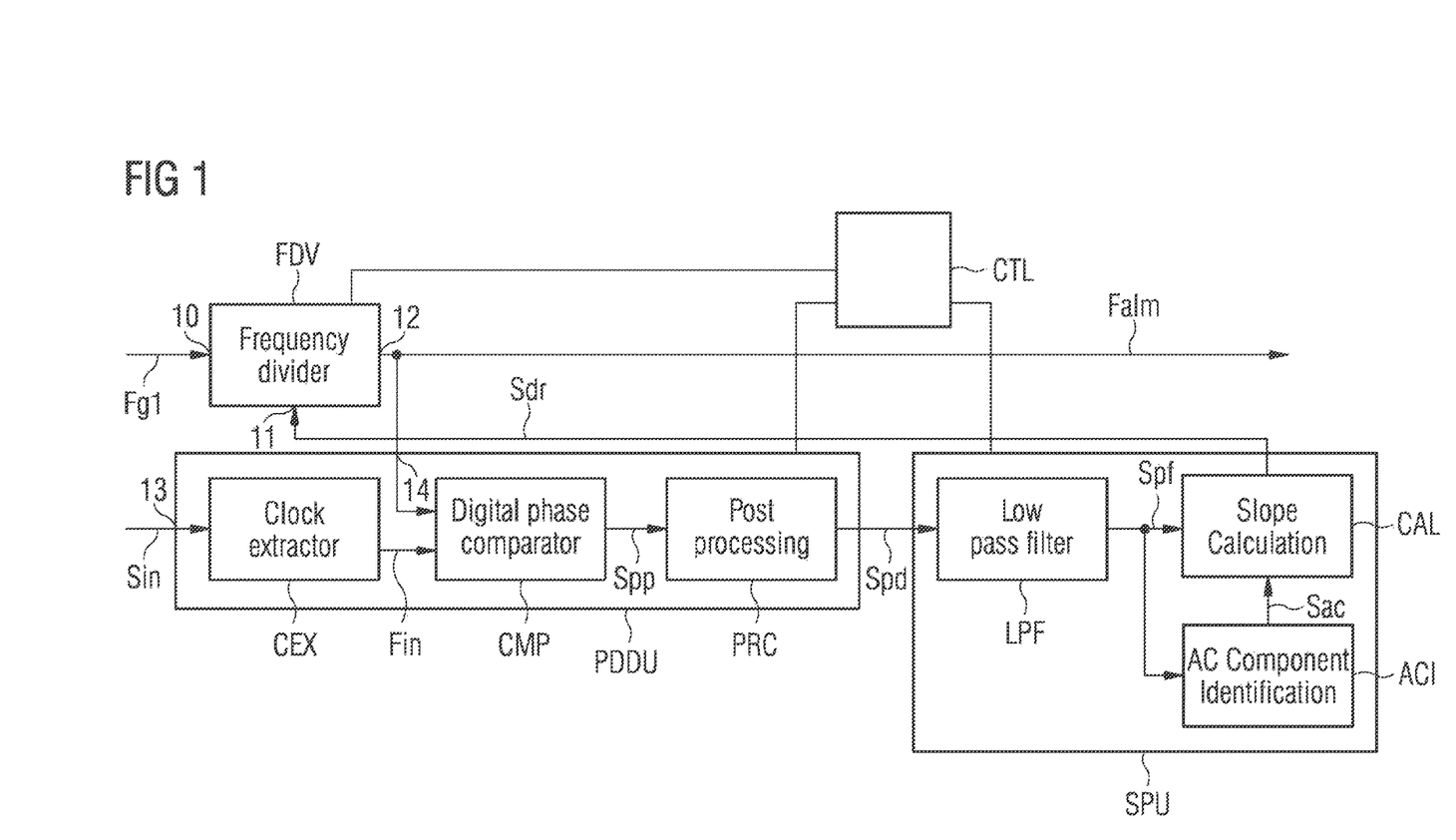
FIG. 1 shows a first embodiment example of the proposed carrier signal generation circuit.

FIG. 1 shows a first embodiment example of the proposed carrier signal generation circuit. The circuit comprises a frequency divider circuit FDV, a phase difference determining unit PDDU and a signal processing unit SPU. A first input 10 of the frequency divider circuit FDV receives a first frequency signal Fg1. A second input 11 of the frequency divider circuit FDV receives a division ratio signal Sdr. A first input 13 of the phase difference determining unit PDDU receives an analog reader device carrier signal Sin. A second input 14 of the phase difference determining unit PDDU receives a carrier signal Falm which is provided by the frequency divider circuit FDV at its output 12. An output of the phase difference determining unit PDDU is coupled to an input of the signal processing unit SPU. The phase difference determining unit PDDU is adapted to provide a phase difference signal Spd as a function of the reader device carrier signal Sin and the carrier signal Falm. The signal processing unit SPU provides the division ratio signal Sdr dependent on the phase difference signal Spd such that the division ratio signal Sdr is a function of a slope of the phase difference signal Spd.

The first example embodiment of the carrier signal generation circuit which is prepared for use in an RFID transponder device further comprises a control unit CTL. The control unit CTL is coupled to the frequency divider circuit FDV, the phase difference determining unit PDDU and to the signal processing unit SPU for respective control of said components.

The phase difference determining unit PDDU comprises a clock extractor unit CEX, a comparison unit CMP, and a post-processing component PRC. The clock extractor unit CEX is prepared to receive the analog reader device carrier signal Sin and to provide a digital reader device carrier signal Fin dependent on the analog reader device carrier signal, for example, by voltage comparison. The comparison unit CMP uses the digital reader device carrier signal Fin in a digital phase comparison with the carrier signal Falm and correspondingly provides a preliminary phase difference signal Spp. Post-processing component PRC applies corrections to the preliminary phase different signal Spp, for example to account for a full clock period difference between the reader device carrier signal Fin and the carrier signal Falm as detailed above. The phase difference signal Spd is provided accordingly.

The signal processing unit SPU comprises a low pass filter component LPF, a slope calculation component CAL and an identifier component ACI. The low pass filter component LPF is prepared to provide a filtered signal Spf by applying low pass filtering to the phase difference signal Spd. The identifier component ACI is prepared to provide an alternating signal Sac dependent on the filtered signal Spf and the phase difference signal Spd, such that the alternating signal Sac corresponds to an alternating component of the phase difference signal Spd. The slope calculation component CAL is prepared to determine the fundamental slope of the filtered signal Spf and provide a corresponding correction of the divisor used in the frequency divider circuit FDV by means of the division ratio signal Sdr. For this the slope calculation component CAL takes into account, amongst others, the alternating component of the phase difference signal Spd provided with the alternating signal Sac.

The control unit CTL is prepared to reset/preset the frequency divider circuit FDV synchronously with the reader device carrier signal in its analog or digital form Sin, Fin, for example in response to a rising edge of said signal. Thereby, a phase of the carrier signal Falm is aligned to a phase of the reader device carrier signal Fin, Sin such that the comparison unit CMP produces correct results. Furthermore, the control unit CTL is prepared to monitor an amplitude of the reader device carrier signal Sin, Fin in order to detect a field-off event. In case an abrupt and significant increase of the amplitude of the reader device carrier signal Sin, Fin, which represents such a field-off event, is detected, the control unit CTL initiates a restart of the signal processing unit SPU. This means that the previously determined results of the slope calculation component CAL are discarded and a new value is calculated.

In other words, a phase difference between the reader device carrier signal Sin, Fin and the generated carrier signal Falm is determined and is represented in a digital way in the form of the phase difference signal Spd which is periodically streamed to the digital filter of the low pass filter component LPF to suppress possible phase modulation of the extracted reader device carrier signal Sin, Fin. The slope of the phase difference signal Spd, which is ramping in time is calculated based on thus filtered signal Spf and an alternating component if existing is identified in the identifier component ACI and is compensated for in the slope calculation component CAL by aligning the slope calculation time to the full period of the alternating component signal Sac or by subtracting the previously identified alternating component signal Sac. Accordingly, the calculated slope is used to set a division ratio or divisor of the frequency divider circuit FDV by means of the division ratio signal Sdr in generation of the carrier signal Falm.

Figure 2:
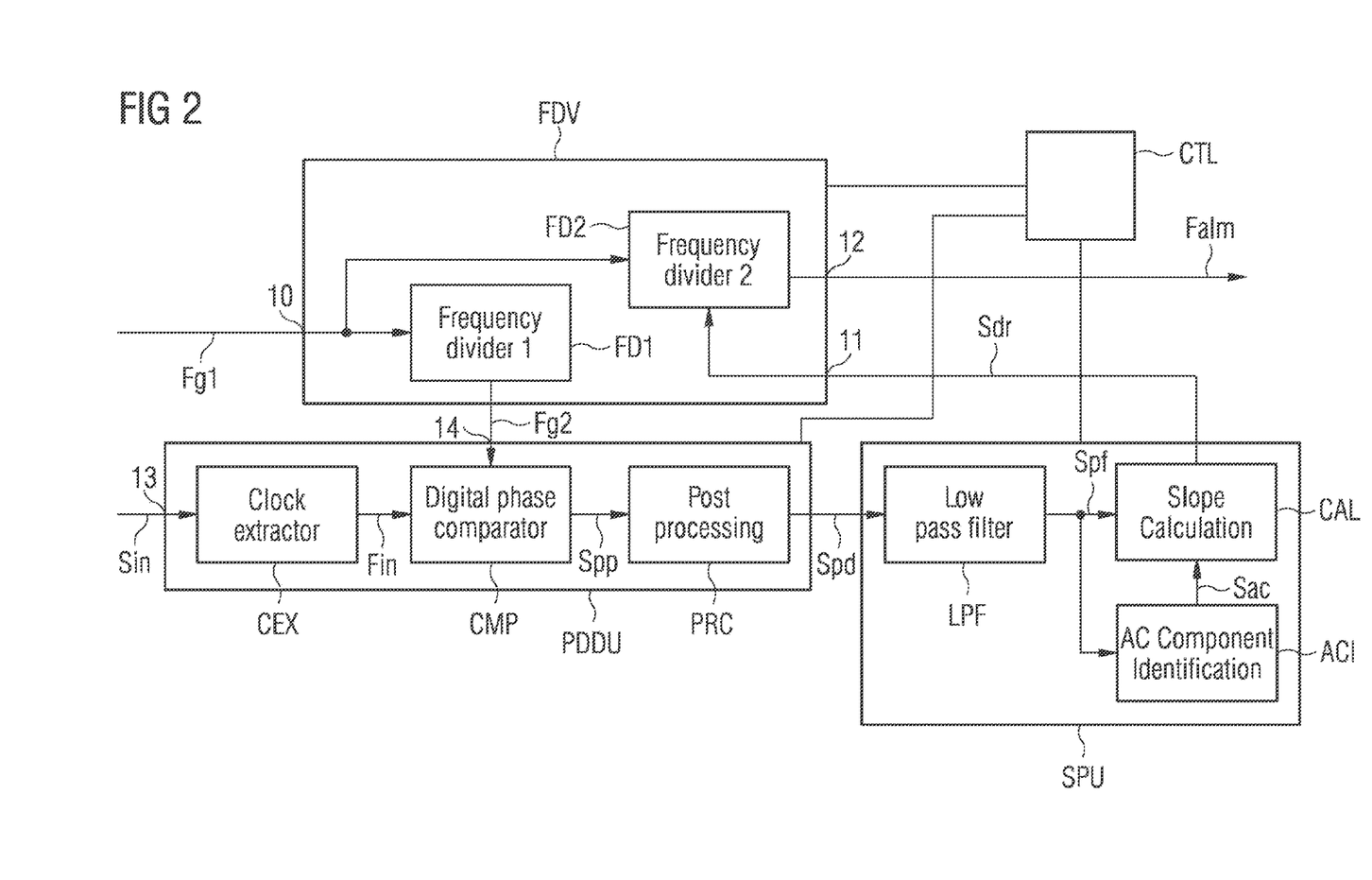
FIG. 2 shows a second embodiment example of the proposed carrier signal generation circuit.

FIG. 2 shows a second embodiment example of the proposed carrier signal generation circuit. The circuit of FIG. 2 corresponds to the circuit depicted in FIG. 1 except for the implementation of the frequency divider circuit FDV. As shown in FIG. 2, the frequency divider circuit FDV comprises a first divider component FD1 and a second divider component FD2. The first divider component FD1 receives the first frequency signal Fg1 and therefrom provides a second frequency signal Fg2 using frequency division with a fixed ratio. The second frequency signal Fg2 is used by the phase difference determining unit PDDU to provide the phase difference signal Spd. The second frequency divider component FD2 also receives the first frequency signal Fg1 and therefrom derives the carrier signal Falm by means of a frequency division using an adjustable divisor which is provided via the division ratio signal Sdr. Consequently, the frequency of the carrier signal Falm is adapted to the frequency of the reader device carrier signal Sin, Fin. A phase difference between the two signals is kept substantially constant.

In the signal processing unit SPU higher frequency components of the phase difference signal Spd are eliminated by means of the filter component LPF. The slope calculation component CAL determines an angle of the slope or ramp of the filtered signal Spf and provides a corresponding divisor by means of the division ratio signal Sdr to the frequency divider circuit FDV.

Advantageously the vast majority of the signal processing is executed on digital signals which enables implementation of the proposed circuit using submicron technology.

Detailed behaviour of the proposed circuit in various surroundings is explained with respect to FIGS. 3 to 6.

FIGS. 3 to 6 each show signal diagrams corresponding to the first embodiment example. The depicted signals represent simulation results. For said simulation the following signals and parameters are employed: The second frequency signal is set to a frequency of 13.560 MHz; the reader device carrier frequency signal's frequency amounts to 13.564 MHz, which is 4 kHz higher than the frequency of the second frequency signal; the low-pass filter component is implemented by a first order low-pass filter with a cut off frequency at 32 kHz; the ratio between an interferer induced on the transponder antenna and the reader device carrier signal amounts to 10, signifying that the reader device carrier signal is ten times stronger than the interferer.

The phase difference signal Spd and the filtered signal Spf are shown with respect to time t in microseconds. The y-axis consequently reflects the phase difference converted into voltage with a conversion factor of 2 millivolt per degree. The phase difference signal Spd is drawn with a solid line, while the filtered signal Spf is indicated by a dotted line.

FIGS. 3 to 6 each have been generated in the presence of a different interferer.

Figure 3:
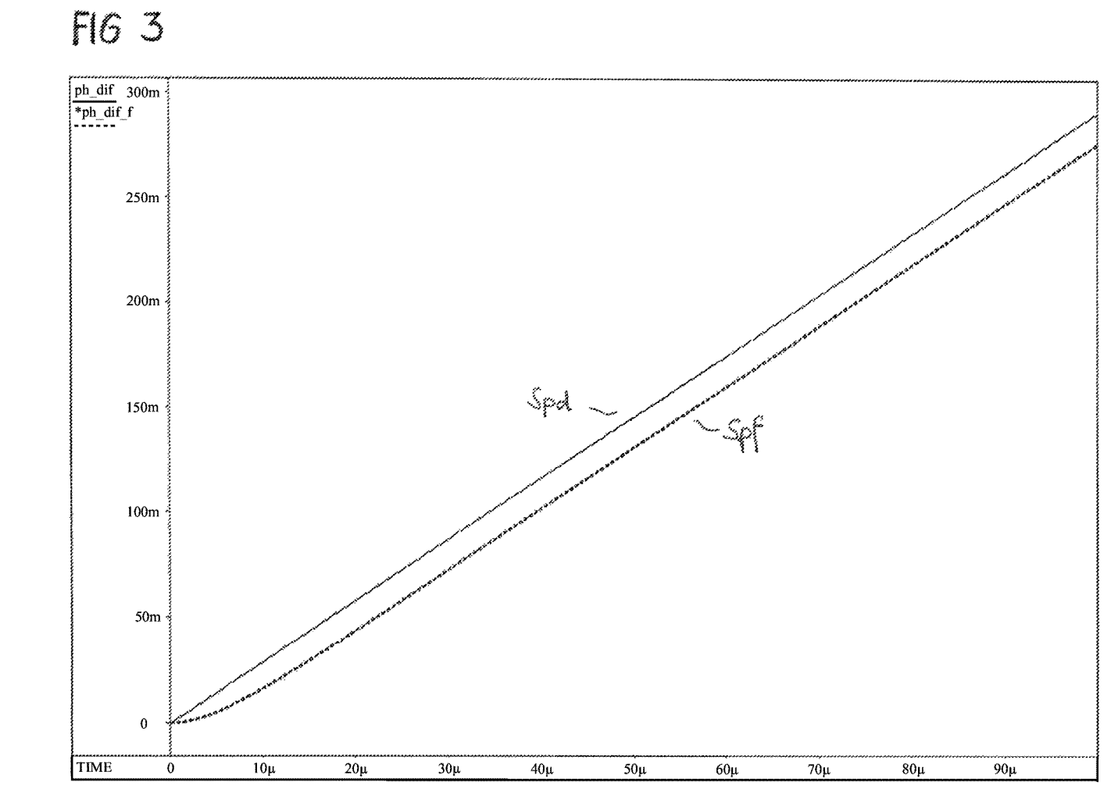
FIG. 3 shows signal diagrams corresponding to the first embodiment example.

FIG. 3 represents an ideal case without perturbation, i.e. the transponder in which the proposed circuit is used just faces one interrogator or reader device, but no interfering device is present.

The phase difference between the reader device carrier signal Fin and the generated carrier signal Falm results in a stepwise ramp of the phase difference signal Spd which comprises a new value for every period of the reference signal. The filtered signal Spf clearly shows the effect of low pass filtering. The resulting distortion of the slope of the filtered signal Spf is accounted for in the slope calculation component.

Figure 4:
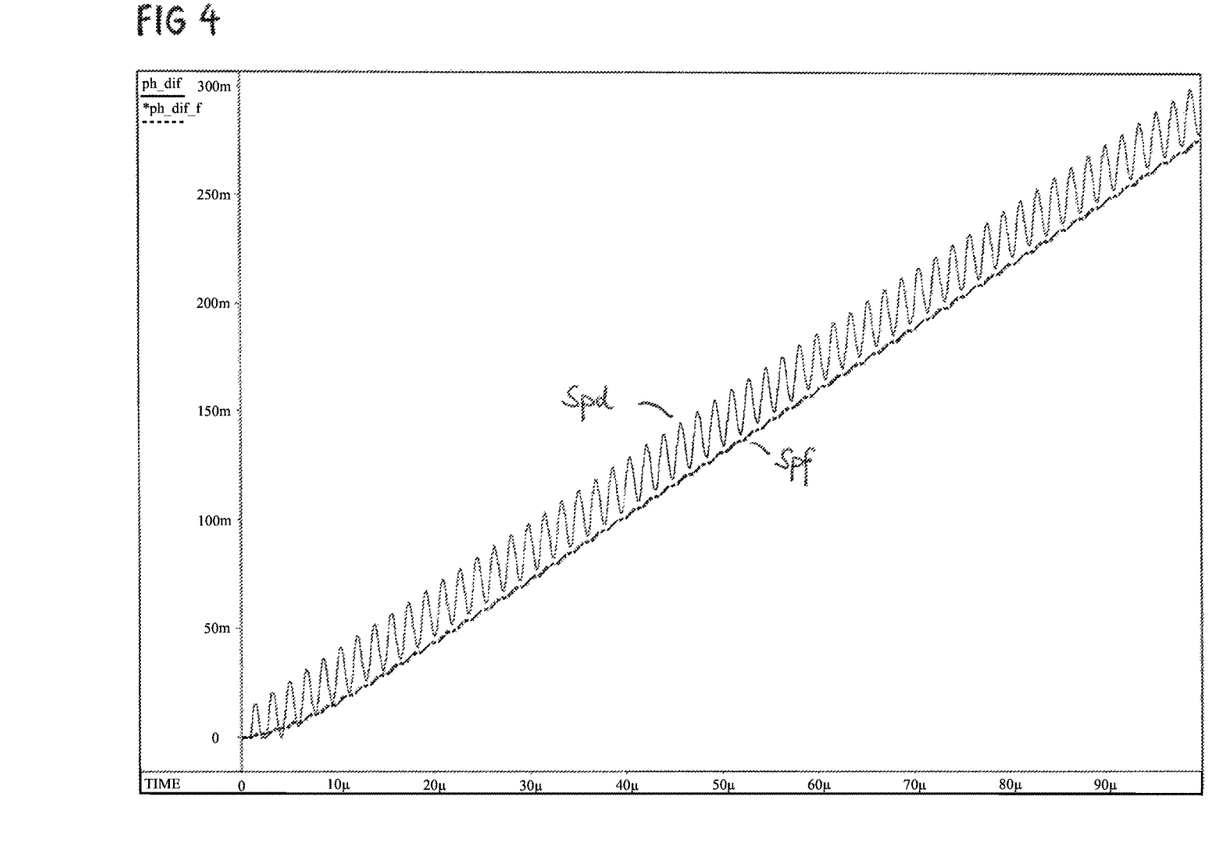
FIG. 4 shows signal diagrams corresponding to the first embodiment example in the presence of a high frequency interferer.

FIG. 4 shows signal diagrams corresponding to the first embodiment example in the presence of an interferer having a frequency of 13.0 MHz. The same signals are depicted as in FIG. 3. However, it can be determined that the phase difference signal Spd has a high frequency alternating component. Most of this high frequency alternating component is removed by a low pass filtering, as can be discerned in the filtered signal Spf.

Figure 5:
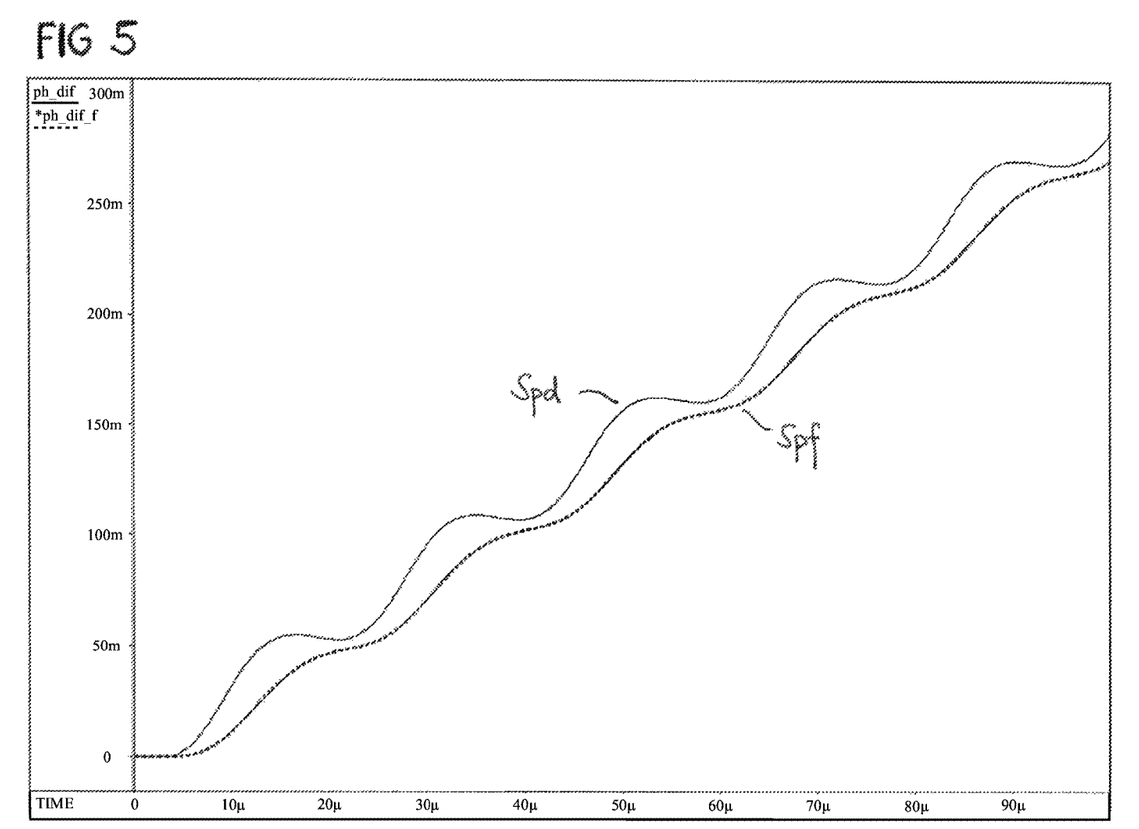
FIG. 5 shows signal diagrams corresponding to the first embodiment example in the presence of another interferer.

FIG. 5 shows signal diagrams corresponding to the first embodiment example in the presence of another kind of interferer. Here, a case is depicted where the frequency of the interfering signal is close to the frequency of the signal of the wanted interrogator or reader device. In the depicted example the frequency of the interfering signal is at 13.51 MHz. Consequently, an alternating component observed in the phase difference signal Spd exhibits few periods during the measurement cycle. The presence of such an alternating signal can be observed by periodically sampling the phase difference signal Spd amplitude. It can also be detected by observing, i.e. periodically sampling, the first or the second derivation of the phase difference signal Spd. Detecting the alternating component and identifying its period offers the possibility to counteract by adapting the duration of the calculation interval used in the slope calculation component to a multiple of the period of the identified alternating signal. This effectively cancels the error introduced by the alternating component.

Figure 6:
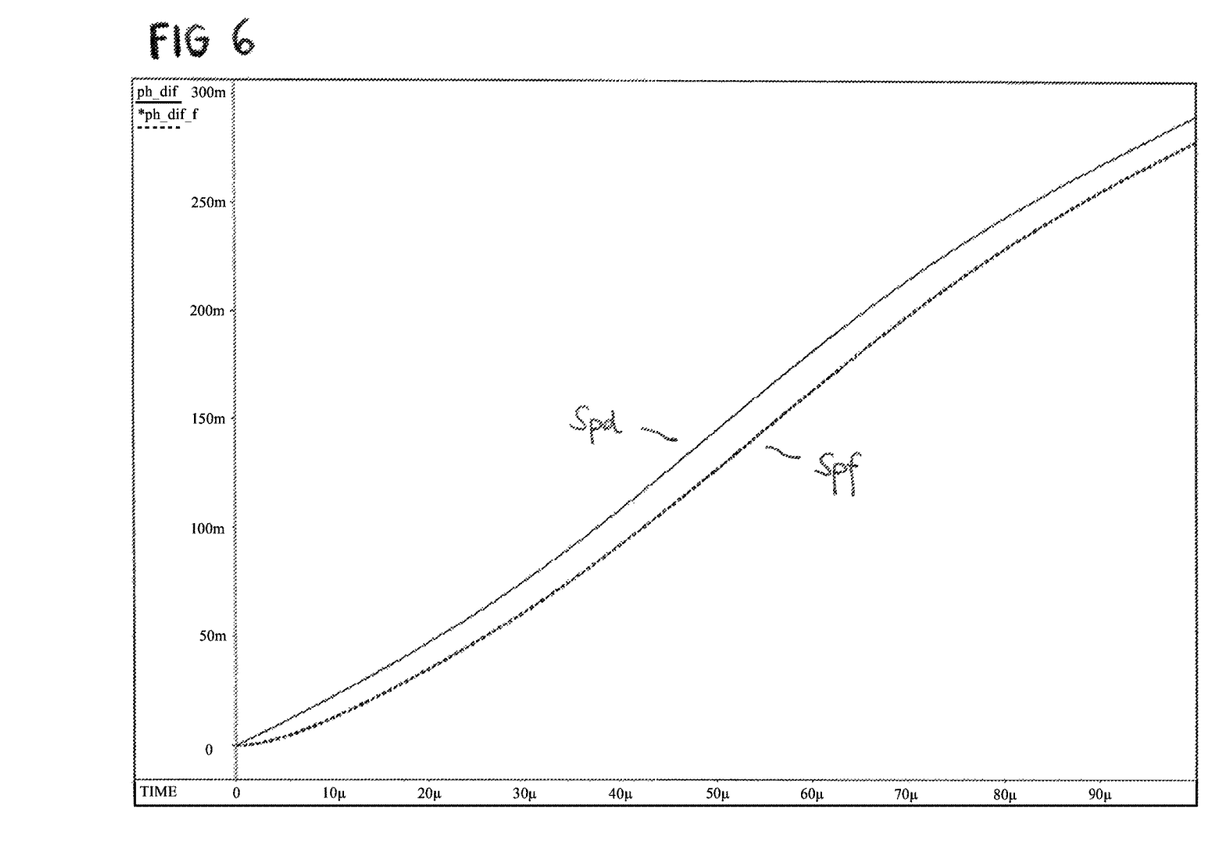
FIG. 6 shows signal diagrams corresponding to the first embodiment example in the presence of still another interferer.

FIG. 6 shows signal diagrams corresponding to the first embodiment example in the presence of still another interferer. In the depicted case a frequency of the interfering signal is extremely close to the frequency of the signal transmitted by the wanted interrogator or reader device. The frequency of the interfering signal is at 13.554 MHz. It can be seen that the resulting phase difference signal Spd has an alternating component which has less than one period. This error can be significantly decreased if the alternating component is identified by its amplitude and frequency or phase. A derivation of first and/or second order may be used to realize this identification. Once the alternating component is identified, it can be subtracted from the actual phase difference signal Spd.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the carrier signal generation circuit and method which are defined in the accompanying claims.

What is claimed is:

1. A carrier signal generation circuit for a Radio-frequency identification (RFID) transponder device, the carrier signal generation circuit comprising:
    a frequency divider circuit with a first input to receive a first frequency signal, a second input to receive a division ratio signal, and an output to provide a carrier signal as a function of the first frequency signal and the division ratio signal;
    a phase difference circuit with a first input to receive an analog reader device carrier signal, a second input to receive a signal based on the first frequency signal and an output to provide a digital phase difference signal as a function of the reader device carrier signal and the signal based on the first frequency signal;
    a signal processor having an input coupled to the output of the phase difference circuit, the signal processor being adapted to provide the division ratio signal dependent on the digital phase difference signal such that the division ratio signal is a function of a slope of the digital phase difference signal: and
    a controller coupled to the frequency divider circuit, the phase difference circuit and to the signal processor, wherein the controller is configured to monitor an amplitude of the reader device carrier signal and to restart the signal processor in case of detection of an abrupt and significant increase of the amplitude of the reader device carrier signal.

2. The carrier signal generation circuit according to claim 1, wherein the signal based on the first frequency signal is the carrier signal.

3. The carrier signal generation circuit according to claim 1, wherein the carrier signal is provided by the frequency divider circuit according to a division of the first frequency signal by an adjustable divisor, which is adjusted dependent on the division ratio signal.

4. The carrier signal generation circuit according to claim 1, wherein the signal based on the first frequency signal is a second frequency signal derived from the first frequency signal.

5. The carrier signal generation circuit according to claim 4, wherein the frequency divider circuit comprises
    a first frequency divider that is configured to provide the second frequency signal dependent on the first frequency signal by a fixed ratio division; and
    a second frequency divider which is configured to provide the carrier signal.

6. The carrier signal generation circuit according to claim 4, wherein the controller is further configured to initially align a phase of the carrier signal or a phase of the second frequency signal to a phase of the reader device carrier signal once using a reset or preset of the frequency divider circuit, the reset or preset being synchronized to the reader device carrier signal.

7. The carrier signal generation circuit according to claim 1, wherein the phase difference circuit comprises:
    a clock extraction circuit configured to receive the analog reader device carrier signal and to provide a digital reader device carrier signal as a function of the analog reader device carrier signal;
    a comparator coupled to an output of the clock extraction circuit and configured to provide a preliminary phase difference signal dependent on a difference of phases between the digital reader device carrier signal and the carrier signal or a second frequency signal derived from the first frequency signal; and
    a post-processing circuit configured to provide the digital phase difference signal dependent on the preliminary phase difference signal.

8. The carrier signal generation circuit according to claim 1, wherein the signal processor comprises:
    a low-pass filter configured to provide a filtered signal as a function of the digital phase difference signal by low-pass filtering, and
    a slope calculation circuit configured to provide the division ratio signal by determining a slope of the filtered signal.

9. The carrier signal generation circuit according to claim 8, wherein the signal processor further comprises an identifier circuit configured to provide an alternating signal dependent on the digital phase difference signal, wherein the alternating signal corresponds to an alternating component of the digital phase difference signal and wherein the alternating signal is provided to the slope calculation circuit.

10. The carrier signal generation circuit according to claim 1, wherein the first frequency signal is supplied by a stable high frequency source and wherein a frequency of the first frequency signal amounts to a multiple of a frequency of the analog reader device carrier signal.

11. A method for generating a carrier signal in an RFID transponder device, the method comprising:
    receiving an analog reader device carrier signal;

generating the carrier signal by frequency division of a first frequency signal by an adjustable divisor that is determined depending on a division ratio signal;

generating a phase difference signal by determining a phase difference between the reader device carrier signal and the carrier signal or by determining a phase difference between the reader device carrier signal and a second frequency signal which is derived from the first frequency signal; and generating the division ratio signal dependent on the phase difference signal such that the division ratio signal is a function of a slope of the phase difference signal;

monitoring an amplitude of the reader device carrier signal;

discarding the adjustable divisor provided with the division ratio signal; and restarting generation of the carrier signal, the phase difference signal and the division ratio signal upon detection of an abrupt and significant increase of the amplitude of the reader device carrier signal.

12. The method according to claim 11, wherein the phase difference signal is generated by determining a phase difference between the reader device carrier signal and the carrier signal.

13. The method according to claim 11, wherein the phase difference signal is generated by determining a phase difference between the reader device carrier signal and a second frequency signal that is derived from the first frequency signal.

14. The method according to claim 11, further comprising aligning a phase of the carrier signal or a phase of the second frequency signal to a phase of the reader device carrier signal once by restarting generating the carrier signal or by restarting generation of the second frequency signal, the restarting being synchronized to the reader device carrier signal.

15. The method according to claim 11, wherein generating the phase difference signal comprises:

digitizing the analog reader device carrier signal to provide a digital reader device carrier signal;

phase comparing the digital reader device carrier signal to the carrier signal or to the second frequency signal to provide a preliminary phase difference signal; and processing the preliminary phase difference signal by correcting invalid values and correspondingly providing the phase difference signal.

16. The method according to claim 11, wherein generating the division ratio signal comprises:

generating a filtered signal by periodically lowpass filtering the phase difference signal; and determining a slope of the filtered signal.

17. The method according to claim 16, wherein generating the division ratio signal further comprises:

identifying an alternating component of the phase difference signal and correspondingly providing an alternating signal; and calculating the slope of the phase difference signal by subtracting the alternating signal from the filtered signal or by aligning a slope calculation time to a period of the alternating signal.

18. A carrier signal generation circuit for a Radio-frequency identification (RFID) transponder device, the carrier signal generation circuit comprising:

a frequency divider with a first input to receive a first frequency signal, a second input, and an output to provide a carrier signal;

a clock extractor configured to generate a reader device carrier signal;

a digital phase comparator having a first input coupled to the output of the frequency divider and a second input coupled to an output of the clock extractor;

a post-processing circuit with an input coupled to an output of the digital phase comparator;

a low-pass filter with an input coupled to an output of the post-processing circuit;

an AC component identification circuit with an input coupled to an output of the low-pass filter;

a slope calculation circuit having a first input coupled to the output of the low-pass filter, a second input coupled to an output of the AC component identification circuit, and an output coupled to the second input of the frequency divider; and a controller coupled to the frequency divider, the clock extractor, the digital phase comparator, the post-processing circuit, the low-pass filter, the AC component identification circuit, and the slope calculation circuit, wherein the controller is configured to monitor an amplitude of the reader device carrier signal and to restart at least one of the low-pass filter, the AC component identification circuit, and the slope calculation circuit in response to a detection of an abrupt and significant increase of the amplitude of the reader device carrier signal.

19. The carrier signal generation circuit according to claim 18, wherein the frequency divider comprises:

a first frequency divider with an input to receive the first frequency signal; and a second frequency divider with a first input to receive the first frequency signal, a second input coupled to the output of the slope calculation circuit, and an output to provide the carrier signal.

* * * * *